(12) United States Patent
Katayama et al.

(10) Patent No.: US 6,415,773 B1
(45) Date of Patent: Jul. 9, 2002

(54) FUEL SUPPLY FOR ENGINE

(75) Inventors: Goichi Katayama; Sadato Yoshida; Masanori Takahashi, all of Shizuoka (JP)

(73) Assignee: Sanshin Kogyo Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/506,976

(22) Filed: Feb. 18, 2000

(30) Foreign Application Priority Data

Feb. 18, 1999 (JP) .......................................... 11-039372
Apr. 28, 1999 (JP) .......................................... 11-121143

(51) Int. Cl.[7] .............................................. F02M 37/04
(52) U.S. Cl. ...................................... 123/541; 123/514
(58) Field of Search .................................. 123/541, 514

(56) References Cited

U.S. PATENT DOCUMENTS

| 4,848,283 A | * | 7/1989 | Garms et al. ............... 123/541 |
| 4,870,828 A | * | 10/1989 | Hidaka ....................... 123/514 |
| 5,309,885 A |  | 5/1994 | Rawlings et al. |
| 5,551,404 A | * | 9/1996 | Bauerle et al. ............ 123/514 |
| 5,797,378 A |  | 8/1998 | Kato |
| 5,832,903 A | * | 11/1998 | White et al. ................ 123/541 |
| 5,975,032 A | * | 11/1999 | Iwata ......................... 123/541 |

* cited by examiner

Primary Examiner—Marguerite McMahon
(74) Attorney, Agent, or Firm—Knobbe, Martens, Olson & Bear LLP

(57) ABSTRACT

A fuel supply for an internal combustion engine includes an improved construction for inhibiting vapor from appearing in the fuel supplied to the engine's combustion chamber(s). A fuel injector, as one of fuel supply devices, is provided for supplying fuel to the combustion chamber of the engine. There are a first and second fuel reservoirs. The first fuel reservoir stores fuel and delivers it to the second fuel reservoir through a first fuel supply conduit, while the second fuel reservoir temporarily store the fuel and delivers it to the fuel injector through a second fuel supply conduit. The excess fuel is returned to the second fuel reservoir from the fuel injector through a fuel return conduit. The fuel supply includes a fuel cooling device for cooling the fuel passing through at least one of the conduits. The construction of the fuel supply and the fuel cooling device permits them to be located with the tight confines between the engine and a protective enclosure (e.g., a cowling of an outboard motor).

5 Claims, 15 Drawing Sheets

FUEL SUPPLY FOR ENGINE

PRIORITY INFORMATION

The present application is based upon and claims priority to Japanese Application Nos. 11-039372 and 11-121143, filed Feb. 18, 1999 and Apr. 28, 1999, respectively, the entire contents of which are hereby incorporated by reference.

BACKGROUND OF THE INVENTION

1. Field of the Invention

This invention relates to a fuel supply for an engine, and more particularly to a fuel injection system that is suitable for an outboard motor engine.

2. Description of Related Art

In the interest of improving engine performance and particularly fuel efficiency and exhaust emission control, many types of engines now employ a fuel injection system for supplying fuel to the engine. In this system, fuel usually is injected into an air induction device by a fuel injector. This fuel injection has the advantages of permitting the amount of fuel delivered for each cycle of the engine to be precisely adjusted. In addition, by utilizing the fuel injection system, it is possible to maintain the desired fuel air ratio under a wide variety of engine running condition.

An amount of the fuel injected by the fuel injector is usually controlled by a control device in response to the engine running conditions. The fuel is delivered to the fuel injector by a fuel pump under a certain fixed pressure and the duration for injection per unit time, i.e., a duty ratio, is controlled by the control device so that any required amount can be metered. Strict control of the fuel amount is quite important for stable operations of the engine.

Some engines for outboard motors employ such a fuel injection system. The fuel injection system generally includes, other than the fuel injector, a main fuel tank disposed on a hull of the associated watercraft for storing fuel and a fuel reservoir attached on the engine for temporarily storing the fuel. The fuel in the main fuel tank is supplied to the fuel reservoir through a fuel supply conduit and the fuel in the fuel reservoir, in turn, is delivered to the fuel injector through another fuel supply conduit. The excess fuel that has not been injected by the fuel injector is returned to the fuel reservoir through a return conduit.

The engine is, due to being employed for outboard motors, operated quite often in a high speed and high load. The engine, thus, produces much heat under this running condition. In addition, the engine is generally enclosed in a protective cowling assembly and the heat accumulates within the cowling. The circumambient air around the engine, as a matter of course, is heated. The fuel supply conduits, at least in part, and the fuel return conduit extend within the protective cowling assembly and are situated, therefore, under the rigorous circumstances.

Under the circumstances, bubbles or vapor can appear in the fuel and can interfere and degrade the strict control of the fuel amount injected during each duty cycle. Vapor lock may even occur in the fuel supply and/or fuel return conduits. If this happens, the fuel is no longer be supplied or returned to the fuel injector or fuel reservoir and the engine consequently stalls.

In order to inhibit the vapor from appearing in the fuel, the fuel reservoir is usually constructed to also function as a vapor separator. The vapor separator can greatly reduce the chances of the vapor appearing in the fuel. However, the fuel is still situated in the warmed or heated surrounding, a vapor lock can occur and/or the duty ratio can be adversely affected.

One resolution to this problem is disclosed in U.S. Pat. No. 5,309,885. The vapor separator disclosed in this patent has a cooling water jacket disposed next to the reservoir portion. However, this construction invites a large scaled structure of the vapor separator and thus does not work well in outboard motor applications because the outboard motor is only allowed to have a very narrow space around the engine within the protective cowling in which to arrange the vapor separator or fuel reservoir. The kind of construction disclosed in the '885 patent, thus, cannot be disposed in the space unless the capacity for containing the fuel is reduced.

The problem described above is not limited to outboard motor engines. Other engines which also are employed within tight fitting enclosures suffer the same problem.

A need therefore exists for an improved fuel supply system that can inhibit vapor from appearing in the fuel supplied to a combustion chamber and that also can be placed within a narrow space so as not to increase significantly the girth of the engine.

SUMMARY OF THE INVENTION

In accordance with one aspect of the present invention, a fuel injection system is provided for an internal combustion engine. The engine has a cylinder body defining a cylinder bore in which a piston reciprocates. A cylinder head is affixed to an end of the cylinder body and defines a combustion chamber with the cylinder head and the piston. The fuel injection system comprises a fuel injector supplying fuel to the combustion chamber. A fuel reservoir at least temporarily stores the fuel therein. A fuel conduit communicates with at least one of the fuel reservoir and the fuel injector, and a fuel cooling device to cool the fuel passing through the fuel conduit. In this manner, fuel vapor formation is inhibited in the fuel delivered to the fuel injector.

In one mode, the engine includes a first fuel supply conduit that supplies the fuel to the fuel reservoir, and a second fuel supply conduit that supplies the fuel from the fuel reservoir to the fuel injector. A fuel return conduit returns the excess fuel from the fuel injector to the fuel reservoir. The fuel cooling device is provided for cooling the fuel passing through at least one of the first fuel supply conduit, the second fuel supply conduit and the fuel return conduit.

In accordance with another aspect of the present invention, a fuel cooling device is provided for a fuel supply system. The fuel supply system supplies fuel to a combustion chamber of an internal combustion engine through a fuel delivery passage. The fuel cooling device comprises a fuel coolant passage extending, at least in part, along the fuel delivery passage.

In accordance with a further aspect of the present invention, an internal combustion engine comprises a cylinder body defining a cylinder bore in which a piston reciprocates. A cylinder head is affixed to an end of the cylinder and defines a combustion chamber with the cylinder head and the piston. A fuel injector sprays fuel toward the combustion chamber. Delivering means is provided for delivering the fuel to the fuel injector. The delivering means includes a fuel passage. A cooling mechanism is arranged to cool the fuel passing through the fuel passage.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

DETAILED DESCRIPTION OF THE PREFERRED EMBODIMENTS OF THE INVENTION

Figure 1:
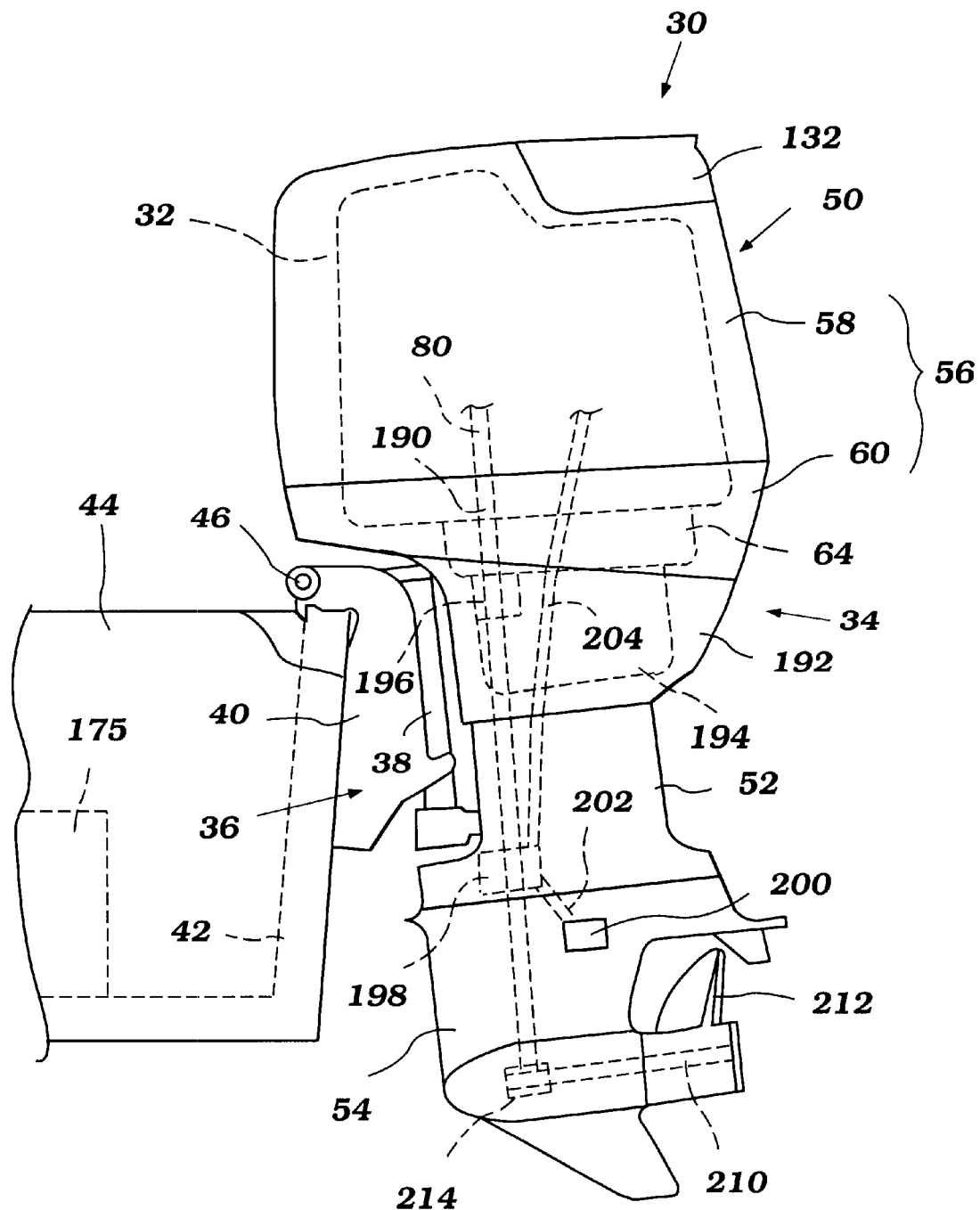
FIG. 1 is an elevational side view showing an outboard motor in accordance with a preferred embodiment of the present invention that is mounted on an associated watercraft. The stem of the associated watercraft is shown partially.
Figure 2:
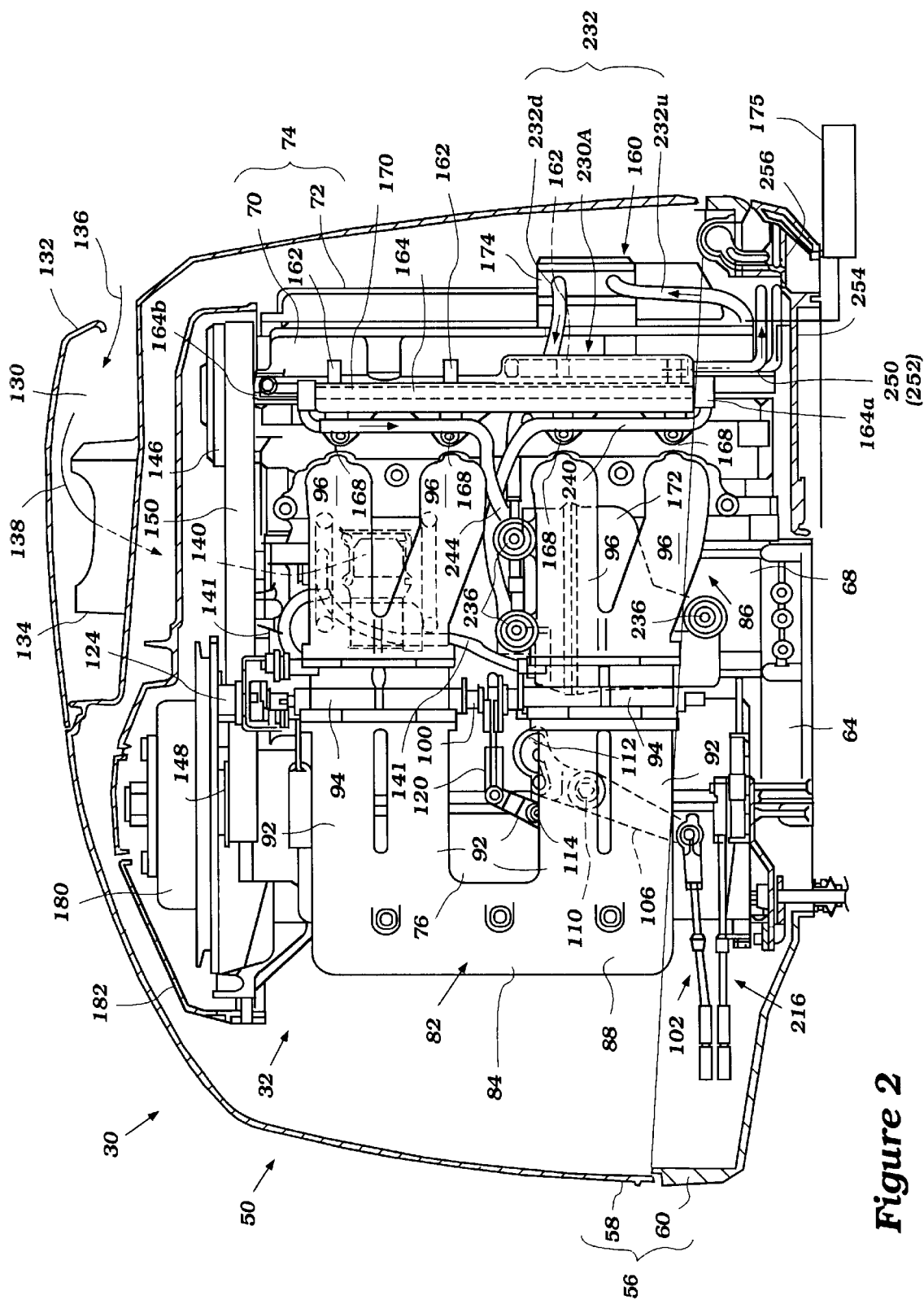
FIG. 2 is an elevational side view showing the outboard motor of FIG. 1, and in particular, its power head including an engine. Top and bottom protective cowlings of the power head are sectioned.
Figure 3:
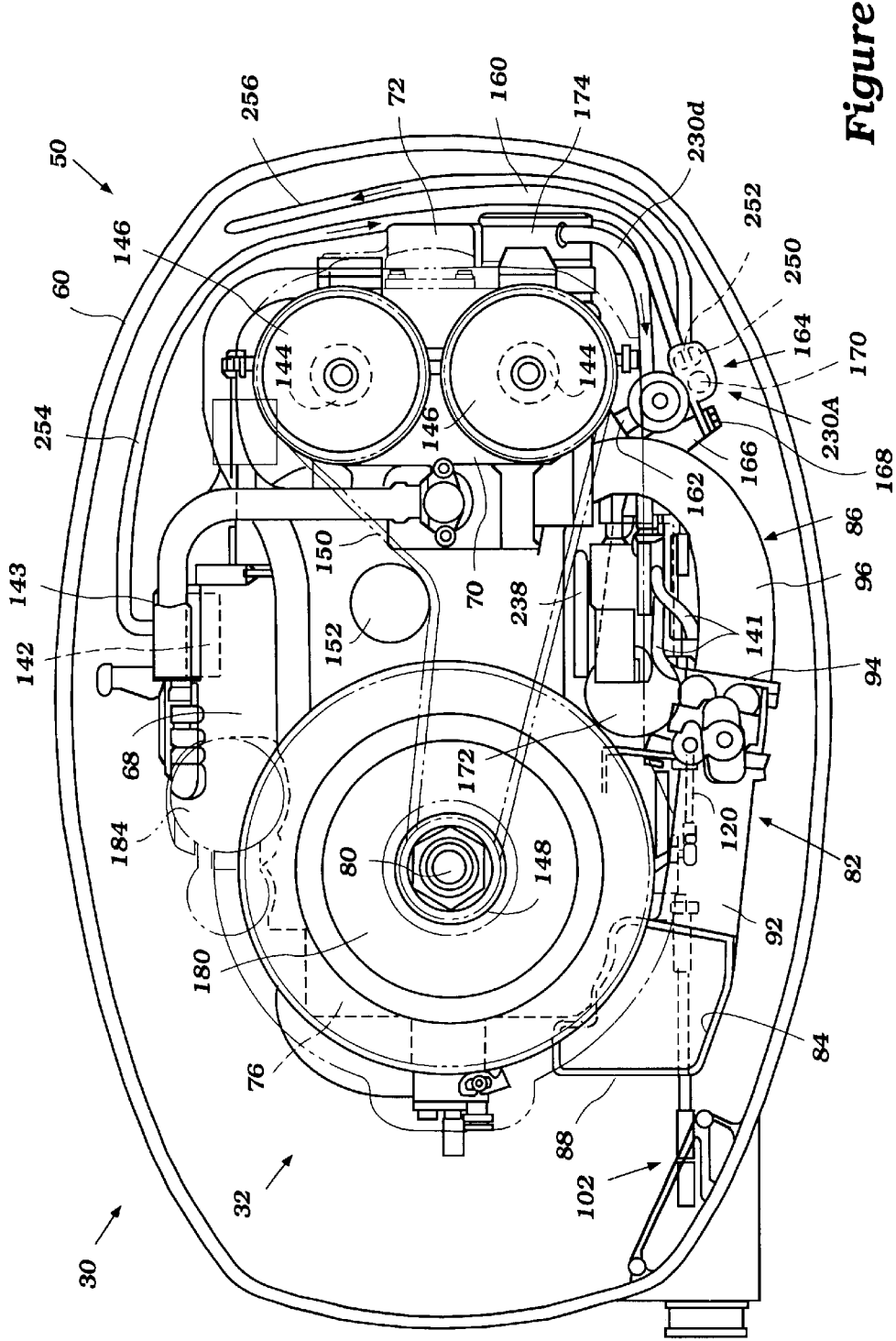
FIG. 3 is a top plan view showing the motor and engine of FIG. 2. The top protective cowling is detached.

With reference to FIGS. 1 to 3, an outboard motor, designated generally by reference numeral 30, includes an internal combustion engine 32 arranged in accordance with a first embodiment of the present invention. Although the present invention is shown in the context of an engine for an outboard motor, various aspects and features of the present invention also can be employed with engines for other types of marine outboard drive units (e.g., a stern drive unit) and also for, for example, land vehicles and stationary engines.

In the illustrated embodiment, the outboard motor 30 comprises a drive unit 34 and a bracket assembly 36. The bracket assembly 36 comprises a swivel bracket 38 and a clamping bracket 40. The swivel bracket 38 supports the drive unit 34 for pivotal movement about a generally vertically extending steering axis. The clamping bracket 40, in turn, is affixed to a transom 42 of the associated watercraft 44 and supports the swivel bracket 38 for pivotal movement about a generally horizontally extending tilt axis, i.e., the axis of a pivot shaft 46.

As used through this description, the terms "fore," "forward" and "front," mean at or to the side where the clamping bracket 40 is located, and the terms "rear," "reverse" and "rearwardly" mean at or to the opposite side of the front side, unless indicated otherwise.

Although not shown, a hydraulic tilt system is provided between the swivel bracket 38 and clamping bracket 40 to tilt up and down and also for the trim adjustment of the drive unit 34. Since the construction of the bracket assembly 36 is well known in the art, further description is not believed to be necessary to permit those skilled in the art to practice the invention.

The drive unit 34 includes a power head 50, a driveshaft housing 52 and a lower unit 54. The power head 50 is disposed atop of the drive unit 34 and includes the engine 32 and a protective cowling assembly 56. The protective cowling assembly 56 includes a top cowling 58 and a bottom cowling 60.

The protective cowling assembly 56 generally completely encloses the engine 32. The top cowling 58 is detachably affixed to the bottom cowling 60 so that the operator can make access to the engine 32 for maintenance or other purposes. The bottom cowling 58 has an opening at its bottom portion through which an exhaust guide 64 extends. The exhaust guide 64 is affixed to atop of the driveshaft housing 32. The bottom cowling 58 and the exhaust guide 64, thus, form a tray. The engine 32 is placed onto this tray and affixed to the exhaust guide 64 to be supported thereby. The exhaust guide 64 also has an exhaust passage therein through which a burnt charge is discharged as described later.

The engine 32 operates on a four stroke cycle principle and powers a propulsion device. This type of engine, however, is merely exemplary. In addition to the illustrated engine type, the present fuel supply system can be employed on engines having other number of cylinders, having other cylinder arrangements, and operating on other combustion principals (e.g., crankcase compression two-stroke or rotary).

As seen in FIGS. 2 and 3, the engine has a cylinder body 68. Although not shown, the cylinder body 68 defines four cylinder bores generally horizontally extending and spaced generally vertically with each other. A piston can reciprocate in each cylinder bore. A cylinder head member 70 is affixed to one end of the cylinder body 68 and defines four combustion chambers with the pistons and the cylinder bores. A cylinder head cover member 72 is affixed to cover the cylinder head member 70. The cylinder head member 70 and cylinder head cover member 72 together form a cylinder head assembly 74.

The other end of the cylinder body 68 is closed with a crankcase member 76 defining a crankcase chamber with the cylinder bores. A crankshaft 80 extends generally vertically through the crankcase chamber. The crankshaft 80 is pivotally connected with the pistons and rotates with the reciprocal movement of the pistons. The crankcase member 76 is located at the most forward position, then the cylinder body 68 and the cylinder head assembly 74 extend rearwardly from the crankcase member 76 one after another.

The engine 32 includes an air induction system 82 and exhaust system. The air induction system 82 is arranged to supply air charges to the combustion chambers. It comprises a plenum chamber 84, four main air intake passages 86 and intake ports. The intake ports are defined in the cylinder head assembly 74 and opened or closed by intake valves. When the intake ports are opened, the air intake passages 86 communicate with the combustion chambers.

The plenum chamber 84 is defined in a plenum chamber member 88 positioned on the port side of the crankcase member 76 in the illustrated embodiment. The air intake passages 86 extend rearwardly from the plenum chamber member 88 along the cylinder body 68 and then bends toward the intake ports. The plenum chamber member 88 has an inlet opening, although it is not shown, at its front side. The plenum chamber 84 defined therein functions as an intake silencer and/or a coordinator of air charges.

The air intake passages 86 are actually defined by duct sections 92, throttle bodies 94 and runners 96. The duct sections 92 are unified with the plenum chamber member 88. The two, upper throttle bodies 94 are unified with each other. The two, upper runners 96, in turn, are uniformly formed together with each other at their fore portions and then forked into two portions. The two, lower throttle bodies 94 and runners 96 have the same constructions as the two, upper throttle bodies 94 and runners 96. The air intake passages 86 comprising these members 92, 94, 96 extend generally horizontally and spaced generally vertically with each other.

The respective throttle bodies 94 support butterfly-type throttle valves therein for pivotal movement about axes of valve shafts extending generally vertically. The valve shafts are linked together to form a single valve shaft 100 that passes through the entire throttle bodies 94. The throttle valves are operable by the operator through a throttle cable 102 and a non-linear control device 104.

The non-linear control device 104 includes a first lever 106 and a second lever 108 joined together with each other by cam connection. The first lever 106 is pivotally connected to the throttle cable 102 and also pivotally connected to a first pin 110 which is affixed to the cylinder body 64. The first lever 106 has a cam hole 112 at the opposite end of the connection with the throttle cable 102. The second lever 108 is generally shaped as the letter "L" and pivotally connected to a second pin 114 which is affixed to the crankcase member 76. The second lever has a pin 118 that inserts into the cam hole 112. The other end of the second lever 108 is pivotally connected to a control rod 120. The control rod 120, in turn, is pivotally connected to the throttle valve shaft 100 with a lever member. A torsion spring, which is omitted in the figure, urges the control rod 120 to stay at a position shown in FIG. 2. At this position of the control rod 120, the throttle valve shaft 100 is in a closed position wherein substantially no air charge can pass through the air intake passages 86.

When the throttle cable 102 is operated, the first lever 106 pivots about the first pin 110 anti-clockwise in FIG. 2. The second lever 108, then, pivots about the second pin 114 clockwise. Since the pin 118 of the second lever 108 lies in the cam hole 112, the second lever 108 moves along this cam shape. The second lever 108 pushes the control rod 120 against the urge of the torsion spring to open the throttle valves. When the throttle cable 102 is released, the control rod 120 returns to the initial position by the force of the spring and the throttle valves are closed again.

A throttle valve position sensor 124 is placed atop of the throttle valve shaft 100. A signal from the position sensor 124 is sent to an ECU (Engine Control Device) which is electronically operated for, for example, fuel injection control and firing control as described later.

As seen in FIG. 2, the top cowling 58 defines a pair of air intake compartments 130 with cover members 132 at both rear sides thereof. Each air intake compartment 130 has an air duct 134 that stands in the compartment 130. The air intake compartments 130, thus, communicate with the interior of the protective cowling assembly 74.

Air is introduced, at first, into the air intake compartments 130 as indicated by the arrow 136 and enters the interior of the cowling assembly 74 through the air ducts 134 as indicated by the arrow 138. Then, the air goes down to the inlet opening of the plenum chamber member 88 and enters the plenum chamber 84. An amount of the air charge is controlled by the throttle valves in the throttle bodies 94 to meet the requirements for operational conditions of the engine 32. The adjusted air charge, then, goes to the runners 96 and finally reaches the intake ports. As described above, the intake valves are provided at these intake ports. Since the intake valves are opened intermittently, the air charge finally enters the combustion chambers through the intake ports.

The air induction system 60 further includes an idle air supply unit 140. The idle air supply unit 140 is affixed to the two, upper runners 96 so as to bypass the throttle valves in the intake air passages 86. Although inlet conduits, which is connected upstream of the throttle valves, are not shown, the idle air supply unit 140 is also connected downstream of the throttle valves in the throttle bodies 94 through outlet conduits 141. A control valve is provided in the unit 140. The ECU controls the opening of the control valve so that an adjusted idle air charge is supplied to the combustion chambers. Thereby, the engine 32 can operate without fluctuations even under the idle condition.

The exhaust system is arranged to discharge burnt charges or exhaust gasses outside of the outboard motor 30 from the combustion chambers. Exhaust ports are defined in the cylinder head assembly 74 and are opened or closed by exhaust valves. When the exhaust ports are opened, the combustion chambers communicate with exhaust passages which guide the exhaust gasses downstream through the exhaust system. For instance, the exhaust system includes an exhaust manifold 142 (see FIG. 3) as one of the exhaust passages, which is defined by the cylinder body 68 and an outer member 143. The exhaust gasses are collected by the exhaust manifold 142 and then sent to the aforenoted exhaust passage formed within the exhaust guide 64 to be discharged.

Two camshafts 144 extend generally vertically to activate the intake valves and exhaust valves. The camshafts 144 have cam lobes thereon to push the intake and exhaust valves at certain timings to open or close the respective ports. The camshafts 144 are journaled between the cylinder head member 70 and a cylinder head cover member 72. The camshafts 144 are driven by the crankshaft 88. The respective camshafts 144 have sprockets 146 thereon, while the crankshaft 88 also has a sprocket 148 thereon. A timing belt or chain 150 is wound around the sprockets 146, 148. With rotation of the crankshaft 88, therefore, the camshafts 144 rotate also. A tensioner 152 is also provided to adjust the tension of the belt or chain 150 by pushing it inwardly so as to keep the opening and closing timing of the intake and exhaust valves accurately. The tensioner 152 includes, for example, a gas cylinder containing compressed gasses therein to produce the tensioning force.

The engine 32 has a fuel injection system 160. The fuel injection system 160 includes four fuel injectors 162 which have injection nozzles exposed to the intake ports so that injected fuel directed toward the combustion chambers 64. The fuel injectors 162 are supported by a fuel rail 164 that is affixed to bosses 166 extending from the cylinder body 68 with screws 168. The fuel rail 164 has an internal fuel passage 170 and the respective injectors 162 meet with the fuel passage 170 so that fuel is supplied therefrom. Although the present fuel supply system is illustrated in the context of a manifold or indirect fuel injection system, it also can be employed with a direct injection system.

In the illustrated embodiment, the fuel injection system 160 farther includes a vapor separator or fuel reservoir 172, a first low pressure fuel pump, a second low pressure fuel pump 174, a high pressure fuel pump, a pressure regulator, a main fuel tank 175 (FIG. 1) and several fuel conduits connecting those components. An amount of each fuel injection and injection timing are controlled by the ECU. This fuel injection system 160 will be described in detail later.

Although not shown, the engine 32 further has a firing system. Four spark plugs are exposed into the respective combustion chambers and are fire an air fuel charge at a proper timing. This firing timing is also controlled by the ECU. The air fuel charge is formed with an air charge supplied by the main air intake passages 86 or idle air supply unit 141 and a fuel charge is sprayed by the fuel injectors 162. The burnt charge, as described above, is discharged outside through the exhaust system.

A flywheel assembly 180 is affixed atop the crankshaft 80. The flywheel assembly 180 includes a generator to supply electric power to the firing system, to the ECU and to other electrical equipment. A cover member 182 covers the flywheel assembly 180, sprockets 146, 148 and the belt 150 for protection of the operator from such moving parts. Additionally, a starter motor 184 is engaged with the flywheel assembly 180 by a gear connection for starting the engine 32.

The engine 32 has a cooling system that provides coolant to engine portions and also to exhaust passages in the driveshaft housing 52 because they generate significant heat during engine operations. In the illustrated embodiment, water is used as the coolant and is introduced from the body of water surrounding the outboard motor 30. A water intake construction will be described shortly.

The water introduced into the cooling system is delivered to the portions which need the cooling water. For instance, a portion around the exhaust manifold 142 in the cylinder body 68 is one of these portions. Thus, the water is supplied there through a water passage or jackets (not shown) formed in the cylinder body 68.

With reference back to FIG. 1, the driveshaft housing 52 depends from the power head 56 and supports a driveshaft 190 which is driven by the crankshaft 56 of the engine 32. The driveshaft 104 extends generally vertically through the exhaust guide 64 and then driveshaft housing 52. The driveshaft housing 40 also defines internal passages which form portions of the exhaust system. An upper portion of the driveshaft housing 52 is covered by an apron 192.

A lubricant reservoir 194 depends from the exhaust guide 64 within the driveshaft housing 52. A lubricant pump 196 is driven by the driveshaft 190 to supply lubricant to engine components that need lubrication. The lubricant then drains to the lubricant reservoir 194.

The driveshaft housing 52 has a water pump 198 that is driven by the driveshaft 190 and supplies cooling water to the aforenoted cooling system. Water is introduced through a water inlet 200 which opens at the lower unit 54. The water inlet 200 is connected to the water pump 198 through an inlet passage 202, while the water pump 198 is connected to the respective portions that need the cooling water through a supply passage 204. The supply passage 204, then, diverges to a plurality of water passages and jackets in the engine 32.

The lower unit 54 depends from the driveshaft housing 52 and supports a propulsion shaft 210 which is driven by the driveshaft 190. The propulsion shaft 210 extends generally horizontally through the lower unit 54. In the illustrated embodiment, the propulsion device includes a propeller 212 that is affixed to an outer end of the propulsion shaft 210 and is driven by the propeller shaft 210. A transmission 214 is provided between the driveshaft 190 and the propeller 212. The transmission 214 couples together the two shafts 190, 210 which lie generally normal to each other (i.e., at a 90° shaft angle) with a bevel gear combination.

Although omitted in FIG. 1, the transmission 214 has a switchover or clutch mechanism to shift rotational directions of the propeller 212 to forward, neutral or reverse. The switchover mechanism includes shift cam disposed in the transmission 214, and a shift cable 216 (see FIG. 2) disposed in the bottom cowling 60 along with the throttle cable 102. A shift rod that extends vertically is also included in the switchover mechanism to connect the shift cam with the shift cable 216. The shift cable 216 extends outwardly from the bottom cowling 60 so as to be operated by the operator. The switchover mechanism 114 is operable at certain engine speeds less than a predetermined speed and has a well known construction.

The lower unit 54 also defines an internal passage that forms a discharge section of the exhaust system. At engine speed above idle, the majority of the exhaust gasses are discharged to the body of water surrounding the outboard motor 30 through the internal passage and finally through a hub of the propeller 212, as well known in the art.

With reference again to FIGS. 2 and 3, the fuel injection system 160 and a fuel cooling device 230A will now be described in detail. The main fuel supply tank 175 (FIG. 1) is placed in the hull of the associated watercraft 44. Fuel is drawn from the fuel tank 175 by the first low pressure fuel pump and the second low pressure pump 174 through an upstream part 232u of a first fuel supply conduit 232. The first low pressure pump is a manually operated pump. The second low pressure pump 174 is a diaphragm type operated by one of the camshafts 144. In the illustrated embodiment, therefore, it is mounted on the cylinder head assembly 74.

Actually, the first fuel supply conduit 232, specifically, the upstream portion 232u thereof, extends from the associated watercraft 44 to the interior of the protective cowling assembly 56 through an opening formed at a front portion of the bottom cowling 60. A quick disconnect coupling, therefore, is provided in this first conduit portion 232u to connect and disconnect both portions existing outside and inside of the cowling assembly 56. A fuel filter is positioned in the conduit portion 232u at an appropriate location.

From the low pressure fuel pump 174, the fuel is supplied to the vapor separator 172 through a downstream part 232d of the first fuel supply conduit 232 and then temporarily stored therein. In the illustrated embodiment, the vapor separator 172 is mounted on the main air intake passages 86 rather than on the cylinder body 68. More specifically, the vapor separator 172 has three flange portions, two of them are positioned at its upper end and the other is at its lower end, and is affixed to the two, lower runners 96 with screws 236. The heat in the engine 32 is not conducted to the vapor separator 172 directly in this arrangement. Besides, relatively cool air flows through the air passages 86. The fuel in the vapor separator 172 can be held in a relatively low temperature. In order to ensure this effect, in the illustrated embodiment, a heat insulator 238 such as, for example, fiber glass or asbestos is inserted between the vapor separator 172 and the cylinder body 68. Otherwise, a relatively large space can simply be formed therebetween in place of the heat insulator 238.

At the vapor separator end of the conduit 232d, there is provided a float valve that is operated by a float so as to maintain a uniform level of the fuel contained in the vapor separator 172.

A high pressure fuel pump, which is driven by an electric motor, is provided in the vapor separator 172 and pressurizes the fuel that is delivered to the fuel injectors 162 through a delivery conduit or second fuel supply conduit 240. As noted above, the fuel injectors 162 are supported by the fuel rail 164 and the fuel rail 164 defines a portion of the delivery conduit 240. The fuel enters the fuel rail 164 from a fuel inlet 164a which is positioned at the bottom end of the fuel rail 164.

A fuel return conduit 244 is also provided between the fuel injectors 162 and the vapor separator 172. The excess fuel that has not been injected by the injectors 162 returns to the vapor separator 172 through this conduit 244. It should be noted that the fuel rail 164 also defines a portion of this return conduit 244, because the excess fuel from the fuel injector 162 placed at lower position flows through the fuel rail 164. The excess fuel is sent back from a fuel outlet 164b which is positioned atop of the fuel rail 164. Actually, the pressure regulator is incorporated within the fuel outlet 164b to limit the pressure that is delivered to the fuel injectors 162.

While the above describe fuel loop essentially places the fuel injectors in series, the fuel supply can also place the fuel injectors in parallel fuel circuits with the fuel delivery conduit communicating with an inlet to each fuel branch and the fuel return conduit communicating with an outlet to each fuel branch. Additionally, the fuel supply can eliminate the fuel return conduit in some application, with the fuel cooling device interacting with the fuel supplied to the fuel injectors through one of the fuel delivery conduits.

The ECU controls the engine operations including the fuel injection. In order to determine appropriate control indexes in control maps, which are stored within and used by ECU, or to calculate them based upon the control indexes determined in the maps, various sensors, including the throttle valve position sensor 124, are provided for sensing engine conditions and other environmental conditions.

As used in the control of the fuel injection, there is provided, associated with the crankshaft 80, a crankshaft angle position sensor (not shown) which, when measuring crankshaft angle versus time, outputs a crankshaft rotational speed signal or engine speed signal.

As aforenoted, an amount of the fuel injected by the fuel injectors 162 is controlled by the ECU in response to various engine running conditions which are sensed with sensors including the throttle valve position sensor 124 and the crankshaft angle position sensor. The fuel is delivered to the fuel injectors 162 by the high pressure fuel pump under a certain fixed pressure regulated by the pressure regulator. Thus, the duration for which the nozzles of the injectors 162 are opened per unit time, i.e., a duty ratio, is controlled by the ECU so that any required amount of fuel can be measured. This method of the fuel injection is well known in the art and no further description is believed to be necessary.

As described above, the fuel may have heat that is conducted from the atmosphere within the protective cowling assembly 50. In the illustrated embodiment, since the excess fuel returns to the vapor separator 172 and again delivered to the fuel injectors 162, the fuel can be warmed up more and more in the circulation. The heat in the fuel may produce vapor that causes the vapor lock or damages the measurement of the fuel amount.

In order to inhibit the vapor from being produced in the fuel, the fuel cooling device 230A is provided. In the illustrated first embodiment, the fuel cooling device 230A is unified with a lower half part of the fuel rail 164. The fuel cooling device 230A includes a couple of water passages 250 and 252 extend along the internal fuel passage 170 and disposed in proximity thereto. That is, the internal fuel passage 170 and the respective water passages 250, 252 are arranged to be in a heat exchange relationship.

Both of the water passages 250, 252 are joined together with each other at their top end portions. One of the water passages 250 is, at its lower end, connected to a water supply conduit 254 that extends to the water passage that is formed in proximity to the exhaust manifold 142, while the other water passage 252 is, also at its lower end, connected to a water discharge conduit 256 that leads to a discharge opening that is formed at the bottom cowling 60 or a common discharge device. Thus, the water to the fuel cooling device 230A is supplied from the water passage after the exhaust manifold 142 is cooled. Although the water is warmed with the heat conducted from exhaust gasses, it is still sufficient to cool the objective fuel.

With the construction and arrangement of the fuel cooling device 230A described above, the fuel is well cooled by the water passing through the water passages 250, 252. This is because the fuel flowing through the relatively slender passage 170 faces the water passages 250, 252 extending almost the half way along it. In addition, since the fuel cooling device 230A can be formed thinner, in other words, not bulky, it can be placed in a narrow space such as even the space formed between the engine 32 and the protective cowling assembly 50.

The fuel cooling device 230A can be unified with an upper half part of the fuel rail 164 or even with the entire of the fuel rail 164.

Figure 4:
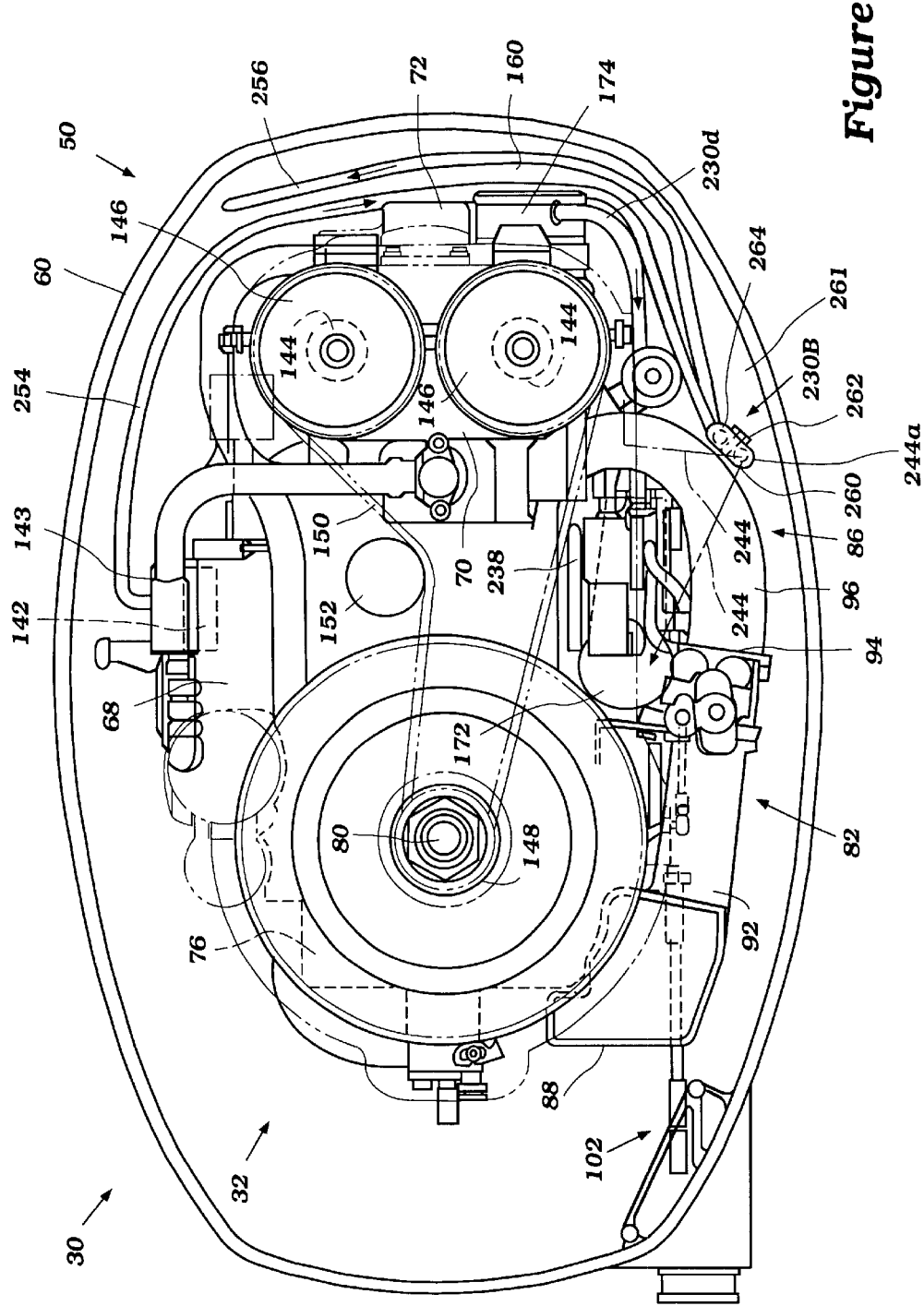
FIG. 4 is a top plan view showing an outboard motor including an engine in accordance with another preferred embodiment of the present invention. A top protective cowling thereof is detached.

FIG. 4 illustrates an outboard motor and engine in accordance with a second embodiment of the present invention. The same members and components that have been described in connection with the outboard motor 30 and engine 32 will be assigned with the same reference numerals and not described repeatedly. Those in the following other embodiments will have the same reference numerals also.

A fuel cooling device 230B is disposed in a space 261 and mounted on the air intake passages 86, specifically, a boss 260 formed on one of the runners 96 with a screw 262. This fuel cooling device 230B involves a portion 244a of the fuel return conduit 244 as extending vertically. The device 230B has also a single water passage 264 that pierces the device 230B from the bottom to the top. The fuel cooling water passage 264 extends along all the way with the fuel return conduit 244.

The fuel cooling device 230B is slender as the device 230A and mounted on the intake passages 86 vertically through which a relatively cool air passes. Thus, it can cool down the fuel passing through the portion 244*a* of the return conduit 244 efficiently and also can be fitted to the space 261 formed between the engine 32 and the protective cowling 50.

Other portions of the air intake passages 86 such as, for example, the duct sections 92, are available for supporting the fuel cooling device 230B.

Figure 5:
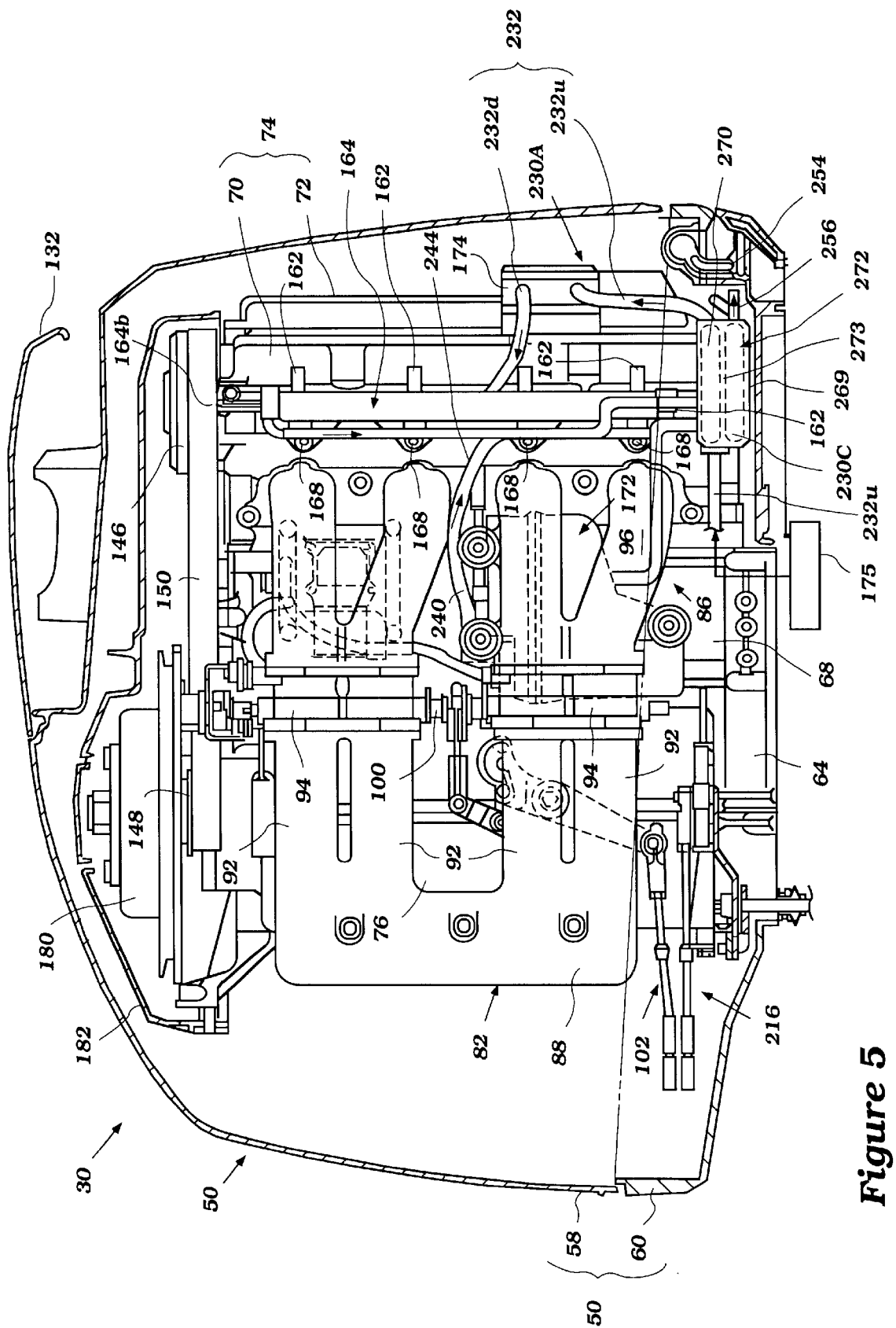
FIG. 5 is an elevational side view showing an outboard motor in accordance with an additional preferred embodiment of the present invention, particularly, its power head including an engine. Top and bottom protective cowlings are sectioned.
Figure 6:
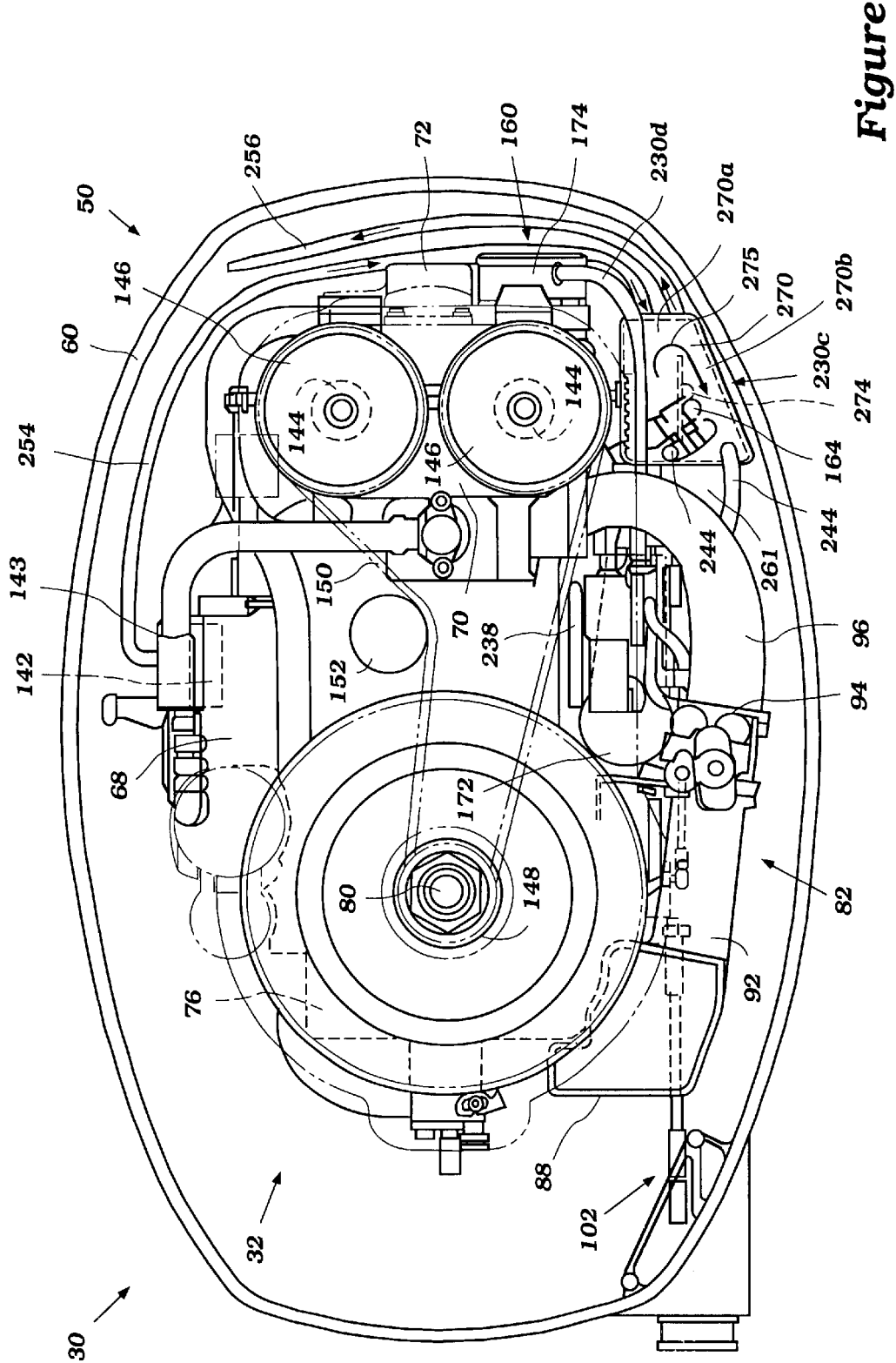
FIG. 6 is a top plan view showing the motor and engine of FIG. 5. The top protective cowling is detached.

FIGS. 5 and 6 illustrate an outboard motor and engine in accordance with a third embodiment of the present invention.

A fuel cooling device 230C in this embodiment includes a jacket 269 having a couple of channels 270, 272 spaced apart vertically with each other by a partition 273 and extending horizontally. The upper channel 270 is interposed in the fuel return conduit 244. As seen in FIG. 6, an incomplete partition 274 divides the fuel channel 270 into two chambers 270*a*, 270*b*. The return fuel enters the chamber 270*a* and then goes to the other chamber 270*b* as indicated by the arrow 275. Meanwhile, the lower channel 272 is connected to both of the water supply conduit 254 and water discharge conduit 256. The jacket 269 is affixed to the bottom cowling 60 in a fastening means such as, for example, a bracket, bolt and nut combination.

The fuel returning from the fuel rail 164 enters the upper or fuel channel 270 and spreads therein as described above and then goes out to the fuel reservoir 172. Meanwhile, the water flowing through the water supply conduit 254 enters the lower or water channel 272 and spreads therein and then goes out to the water discharge conduit 256.

The return fuel abuts the cooling water with a relatively large area in this construction. This is advantageous in expediting cooling of the fuel. In addition, because of the incomplete partition 274, the fuel must detour around it. The return fuel, therefore, will not immediately go out from the fuel channel 270 and can stay therein for a while to be sufficiently cooled.

The water channel 272 may have a similar incomplete partition.

In this embodiment, the device 230C can be disposed in a dead space and hence will not interfere with other existing components or members. In addition, since the device 230C is affixed to the bottom cowling 60 and hence positioned in a relatively low position, it does not disturb maintenance or other works when the top cowling 58 is detached.

Figure 7:
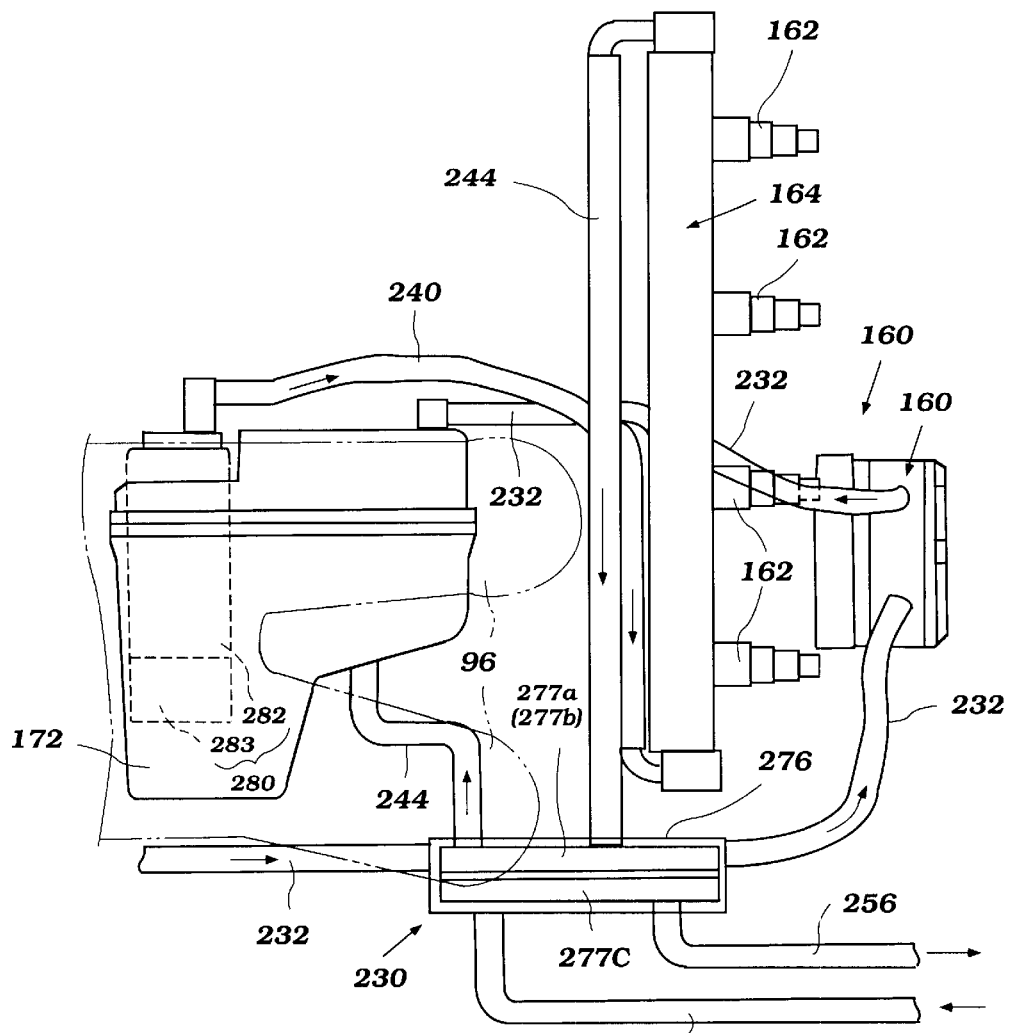
FIG. 7(A) is a schematic view partially showing a fuel injection system including a fuel cooling device in accordance with a further preferred embodiment of the present invention.
FIG. 7(B) is a cross-sectional view taken along the line 7—7 in FIG. 7(A) showing respective channels formed within the fuel cooling device.
Figure 7:
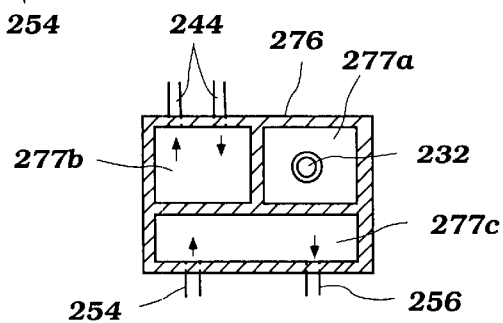

FIGS. 7(A) and (B) illustrate a fuel injection system 160D in accordance with a fourth embodiment of the present invention.

A fuel cooling device 230D in this embodiment has a jacket 276 that is similar to the aforenoted jacket 269. However, as seen in FIG. 7(B), the jacket 276 has three channels 277*a*, 277*b*, 277*c* formed therein. The first fuel supply conduit 232 is joined to the channel 277*a*. The fuel return conduit 244, in turn, is joined to the channel 277*b*. Then, the water supply conduit 154 and water discharge conduit 256 are joined to the channel 277*c*. The jacket 276 is affixed to the runner 96 positioned at the bottom in an appropriate fastening manner such as, for example, a bracket, bolt and nut combination.

In similarity to the third embodiment described above, the major part of the device 230D is placed in a space between the runner 96 and bottom cowling 60 and hence will not interfere with other existing components or members also. In addition, the fuel is cooled twice by the fuel cooling device 230D on the way to the low pressure fuel pump 160 and one more way in returning to the vapor separator 172. Thus, the cooling of the fuel in this embodiment can be achieved exceedingly efficiently.

This figure, additionally, shows a pump unit 280 formed with the high pressure fuel pump 282 and the electric motor 283. As noted above, the pump unit 280 is placed in the vapor separator 172.

Figure 8:
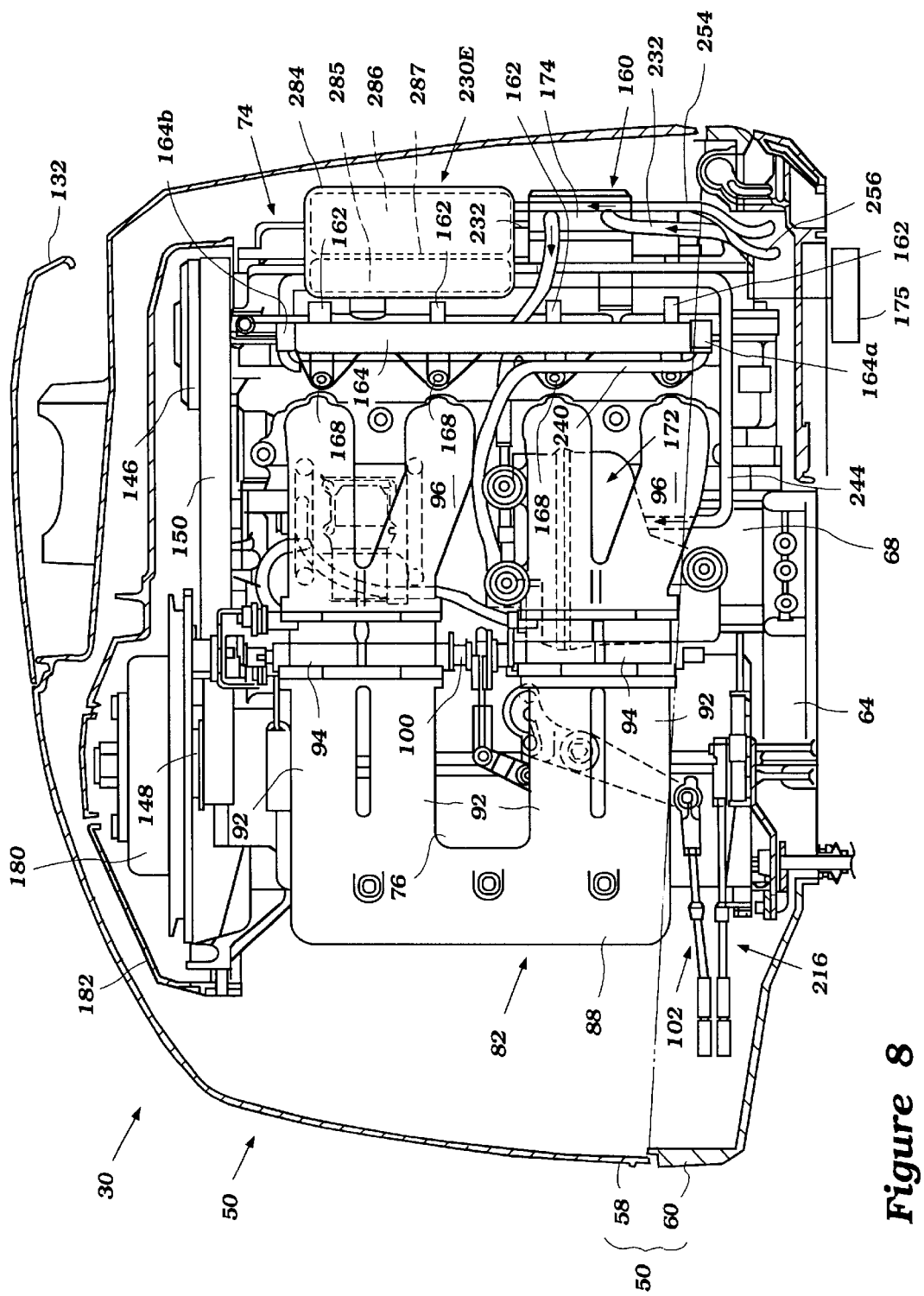
FIG. 8 is a side view showing an outboard motor in accordance with an additional preferred embodiment of the present invention, particularly, its power head including an engine. Top and bottom protective cowlings are sectioned.
Figure 9:
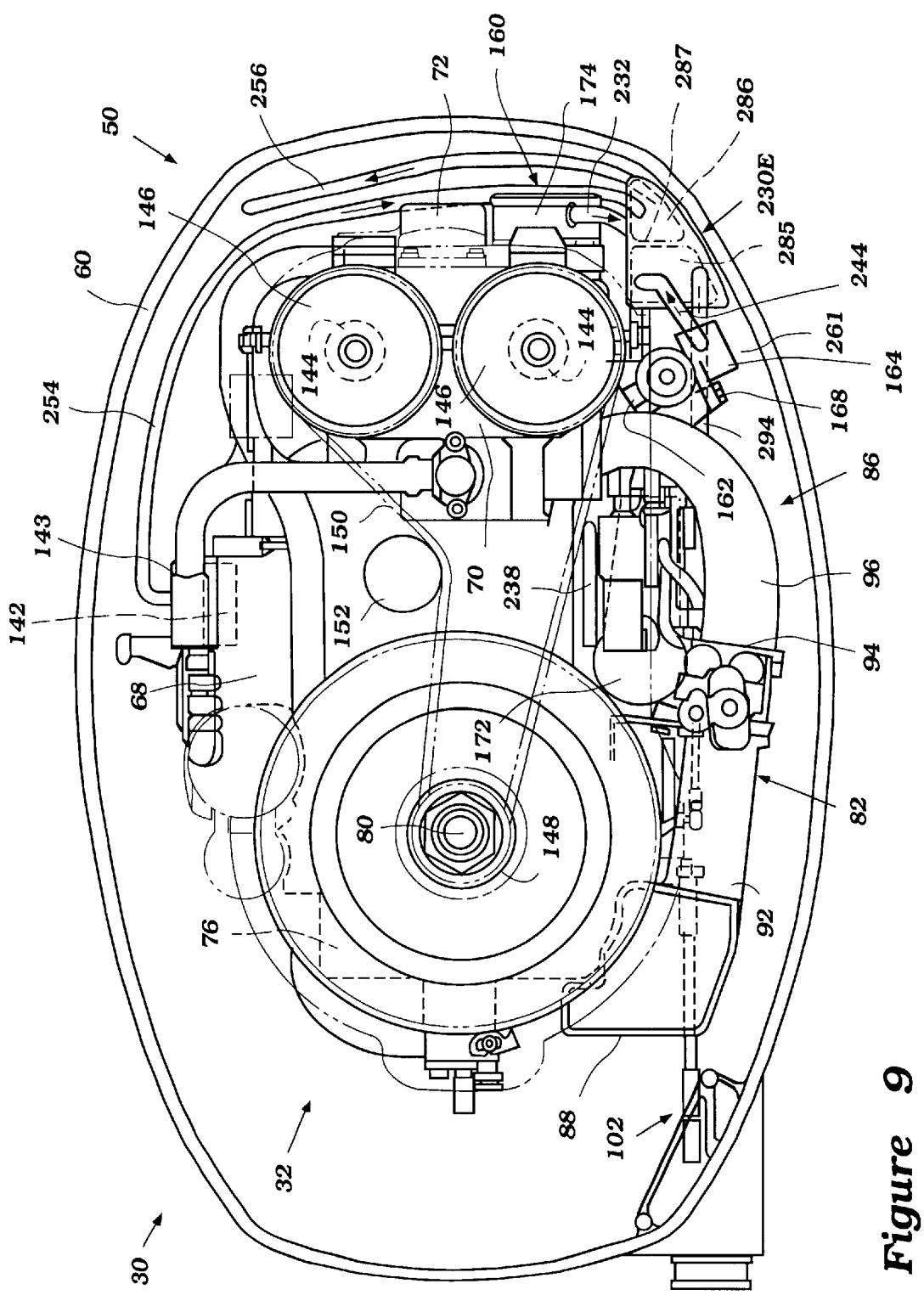
FIG. 9 is a top plan view showing the outboard motor and engine of FIG. 8. The top protective cowling is detached.

FIGS. 8 and 9 illustrate an outboard motor and engine in accordance with a fifth embodiment of the present invention.

In this embodiment, a fuel cooling device 230E includes a jacket 284 having a fuel channel 285 and a water channel 286 therein. The respective channels 285, 286 are spaced apart with each other by a partition 287 that extends generally vertically. The jacket 284 is affixed to the cylinder head assembly 174 in a fastening manner such as, for example, a bracket, bolt and nut combination. The fuel return conduit 244 is joined to the fuel channel 285, while the water supply conduit 254 and water discharge conduit 256 are joined to the water channel 286.

The fuel, therefore, can be well cooled. Besides, the fuel cooling device 230E is placed in a space between the cylinder head assembly 74 and top cowling 58 and hence will not interfere with other existing components or members also.

Figure 10:
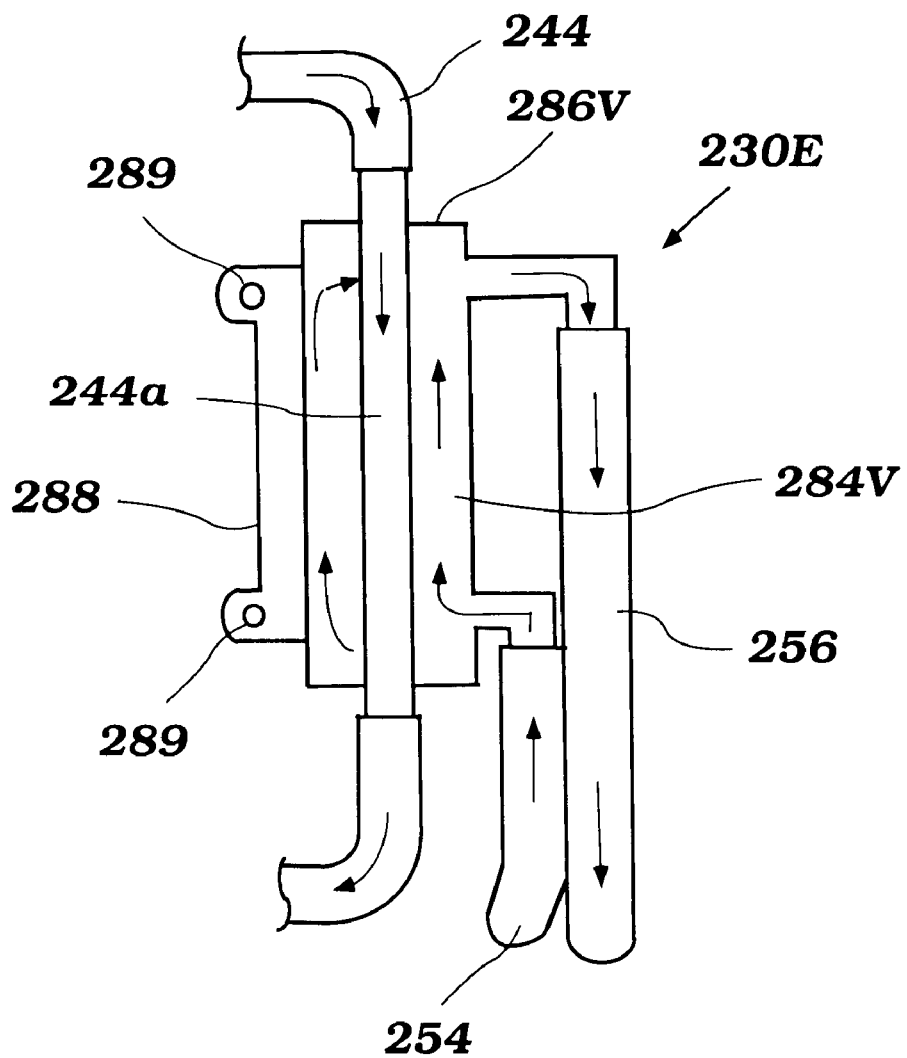
FIG. 10 is a schematic view showing a variation of the cooling device shown in FIGS. 8 and 9.

FIG. 10 schematically illustrates an alternative of the fuel cooling device 230E.

This alternative construction has a similar water channel 284*v* in a jacket 286*v*. The fuel channel 285, however, is replaced by a fuel return pipe 244*a* that define a portion of the fuel return conduit 244. The jacket 286*v* has a bracket 288 that is affixed to the cylinder head assembly 74. The bracket 288 is, therefore, provided with a pair of bolt holes 289.

Figure 11:
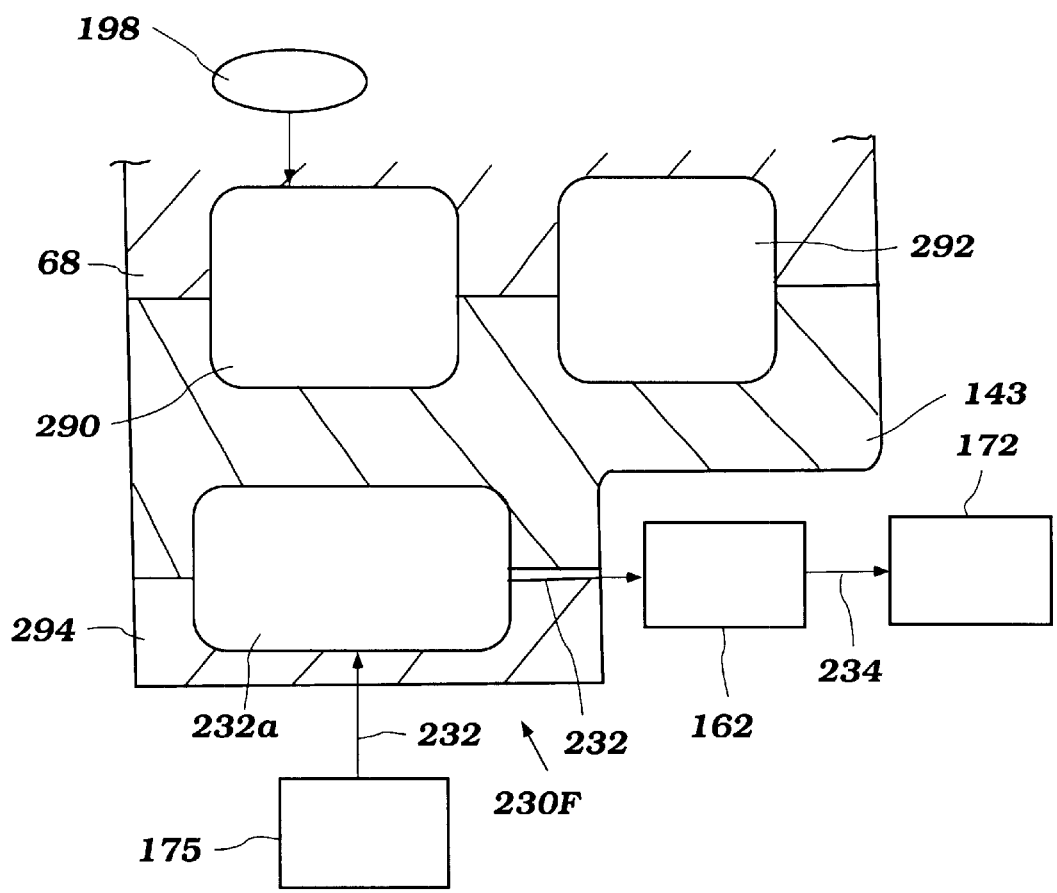
FIG. 11 is a schematic cross-sectional view showing a construction for cooling a cylinder body including a part of an exhaust system therein and involves a fuel passage in accordance with another preferred embodiment of the present invention.

FIG. 11 illustrates a fuel cooling construction in accordance with a sixth embodiment of the present invention.

This construction is primarily provided for cooling the cylinder body 68 that includes a part of the exhaust system, specifically, the exhaust manifold 142, therein. The cylinder body 68 defines the exhaust manifold 142 with the outer member 143 as noted above. Since the exhaust manifold 142 does not exist in this section, it is not shown. A water supply passage 290 and water discharge passage 292 are also formed between the cylinder body 68 and outer member 143. In the illustrated embodiment, another passage 232*a* is formed between an outer surface of the outer member 143 and a cover member 294. The main fuel tank 175 is connected to the passage 232*a* and then the passage 232*a* is connected to the second low pressure pump 162. Thus, the passage 232*a* defines a portion of the first fuel supply conduit 232. The fuel passage 232*a* is disposed in the proximity of the water supply passage 290.

In this embodiment, therefore, the water supply passage 290 defines the fuel cooling device 230F. The fuel passing through the fuel passage 232*a* is effectively cooled by the water passing through the water supply passage 290.

The fuel passage 232 can be placed in proximity to the water discharge passage 292. However, the supply passage 290 is better than the discharge passage 292 because fresh water flows through the supply passage 290.

Figure 12:
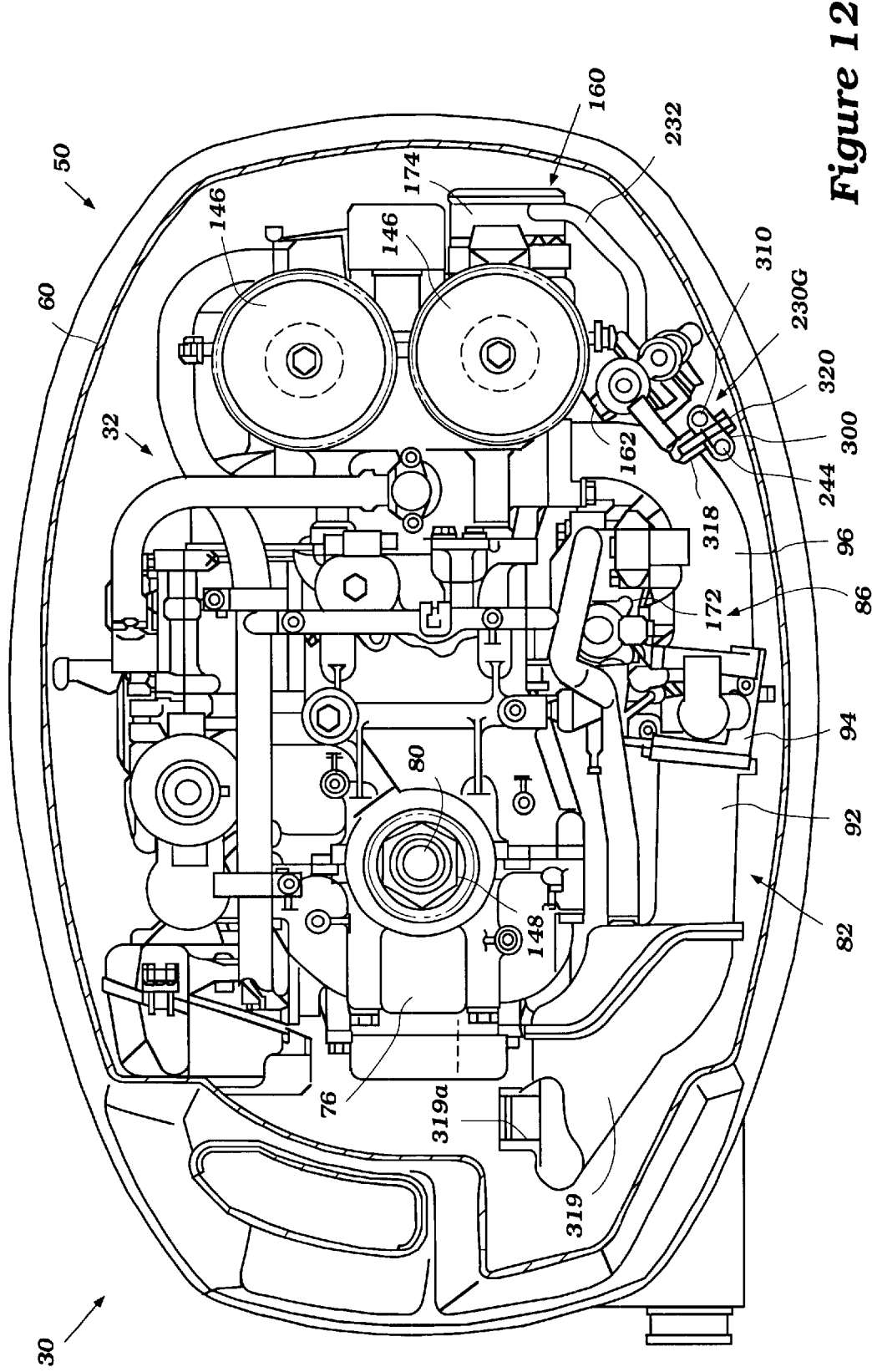
FIG. 12 is a top plan view showing an outboard motor including an engine in accordance with an additional preferred embodiment of the present invention that is similar to the embodiment shown in FIG. 4. A top protective cowling thereof is detached.
Figure 13:
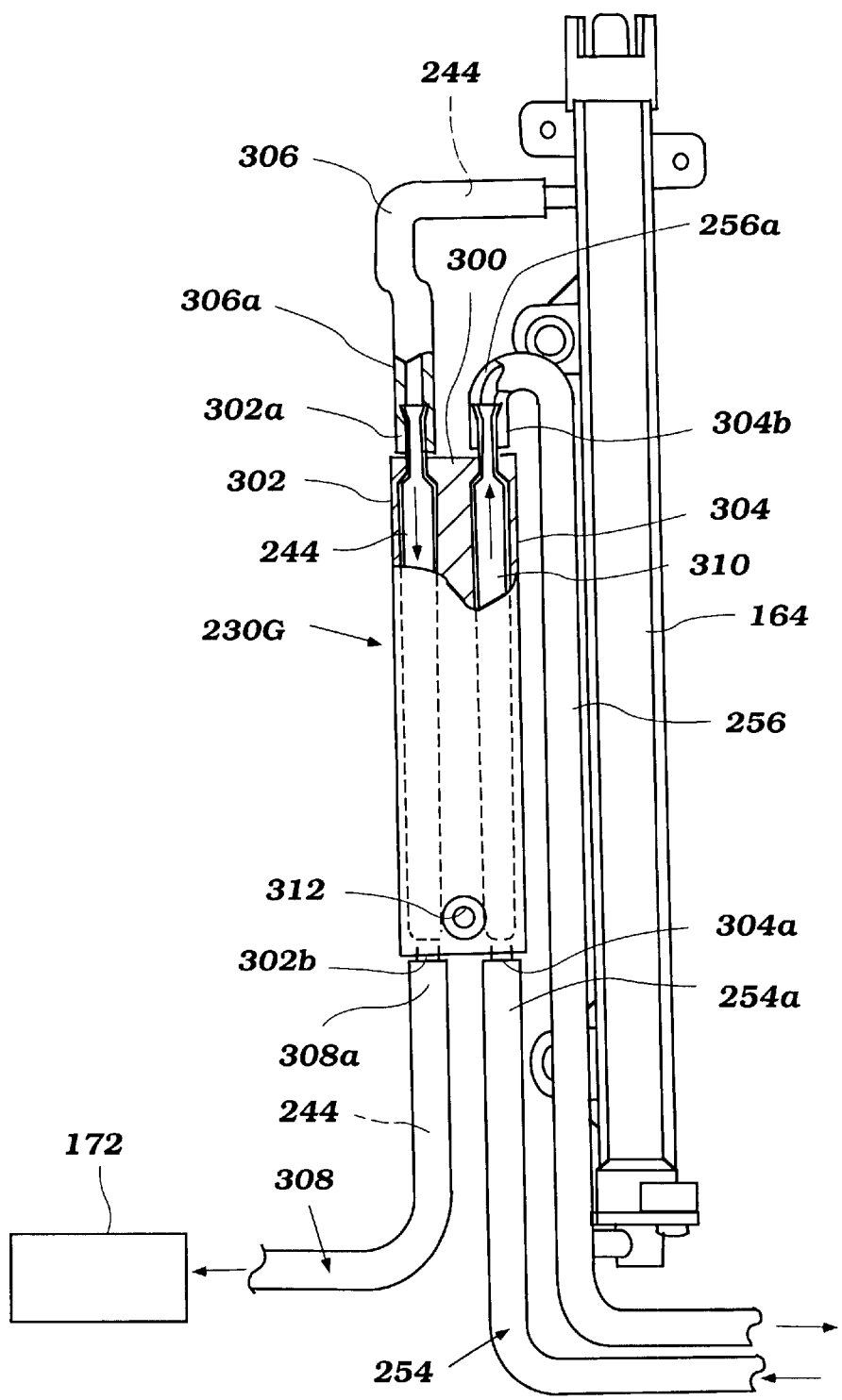
FIG. 13 is an enlarged side elevational view showing a fuel cooling device employed in a fuel injection system for the engine of FIG. 12 and also applicable to the engine shown in FIG. 4. The fuel cooling device is partially sectioned.

FIGS. 12 and 13 illustrate an outboard motor and engine in accordance with a seventh embodiment.

A fuel cooling device 230G in this embodiment is similar to the fuel cooling device 230B in the second embodiment shown in FIG. 4. The fuel cooling device 230B includes a common holder member 300 that has a rectangular shape. The holder member 300 is made of aluminum or aluminum alloy. A couple of openings which extend parallel to each other are formed in the holder member 300 and pipes 302, 304 are inserted in the respective openings. The pipes 302, 304 are made of metal material which has higher ionization tendency than aluminum such as, for example, brass. In the illustrated embodiment, the pipes 302, 304 are made of brass. Both end portions 302a, 302b and 304a, 304b of the respective pipes 302, 304 are narrowed and shaped as nipples. The holder member 300 and the inserted pipes 302, 304 define the fuel cooling device or assembly 230G.

Actually, the fuel cooling assembly 230G is produced by casting. The brass pipes 302, 304 are laid in parallel to each other in a mold of the holder member 300. Aluminum or aluminum alloy is poured into the mold and, then, the mold is stripped out from the casting.

The end portion 302a is connected to a fuel outlet of the fuel rail 164 through a conduit member 306, while the other end portion 302b is connected to the vapor separator 172 through a conduit member 308. More specifically, one end 306a of the conduit member 306 is fitted onto the nipple end of the pipe 302a, while one end 308a of the conduit member 308 is fitted onto the nipple end of the pipe 302b. The conduit members 306, 308 and the pipe 302, therefore, together with each other define portions of the fuel return conduit 244. The conduit members 306, 308 are omitted in FIG. 12.

Likewise, the end portion 304a is connected to the water supply conduit 254 at its end portion 254a. The other end portion 304b is connected to the water discharge conduit 256 at its end portion 256a. The pipe 304, therefore, defines an internal water passage 310. The water supply conduit 254 and water discharge conduit 256 are omitted in FIG. 12.

The fuel cooling assembly 230G has an aperture 312, which extends normal to the passages 244, 310, between the pipes 302, 304 and at the bottom thereof. The device 230G is affixed to a boss 318 formed on one of the runners 96 with screws 320 that passes through the aperture 312. When mounted on the runner 96, the rectangular holder member 300, which involves the internal portion of the return conduit 244 and internal water passage 310 together, extends generally vertically.

A plenum chamber 319 in this illustrated embodiment has a different shape and its inlet opening 319a is shown in FIG. 12.

Like the device 230B, the fuel cooling device 230G is slender and mounted on the runner 96 vertically. Thus, it can cool down the fuel passing through the internal portion of the return conduit 244 efficiently and also can be well disposed to the space formed between the engine 32 and the protective cowling assembly 50.

Also, the heat of the fuel passing through the return conduit 244 is quite effectively conducted to the cooling water passing through the internal water passage 310 because the common holder member 300 is made of aluminum.

In addition, the pipes 302, 304 made of brass are inserted in the aluminum holder 300. The combination is advantageous because water, even if seawater, cannot corrode the brass pipes 302, 304. This is because the brass material has lower ionization tendency than the aluminum material as aforenoted. Accordingly, in the event that the holder member 300 were to be corroded, the pipes 302, 304 would not be corroded. The water in the water passage 310 will not break into the fuel return passage 244 accordingly. Since the holder member 300 is produced by casting, mold cavities or cracks may appear therein. However, the inserted pipes 302, 304 will isolate the fuel return conduit 244 from the water passage 310 at all events and water will never enter the fuel conduit 244.

Figure 14:
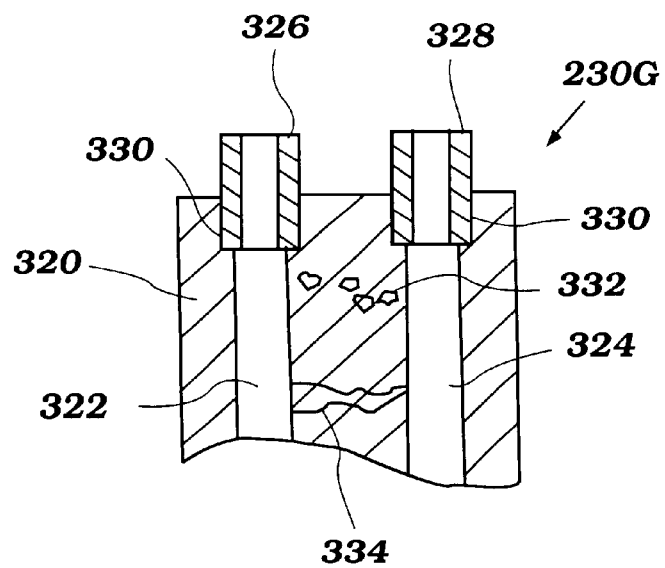
FIG. 14 is a cross-sectional view showing a variation of the fuel cooling device shown in FIG. 13.

FIG. 14 illustrates an alternative of the fuel cooling device 230G shown in FIG. 13.

A block 320 for the fuel cooling device 230G in the alternative shown in FIG. 14 is also produced by casting with openings, but no pipes are inserted to the openings. The openings in the holder member 320 simply function as a fuel return conduit 322 and a water conduit 324. Connecting members 326, 328, to which the external portion of the return conduit and the water supply and discharge conduits are connected, are connected to respective ends of the conduits 322, 324. If the block 320 is made of aluminum, the connecting members 326, 328 are desirably made of the metal material having lower ionization tendency than the aluminum material such as the brass material also. Otherwise, corrosion can appear at the contact portion 330.

As noted above, the casting of the block 320 may have mold cavities 332 and/or cracks 334. This alternative construction cannot effectively prevent the water in the water passage 324 from entering the fuel passage 322. However, if the blocks 320 having the mold cavities 332 and/or cracks 334 are carefully eliminated, the construction is still useful for cooling the fuel down. This alternative construction, additionally, is not costly relative to the construction shown in FIG. 13.

Figure 15:
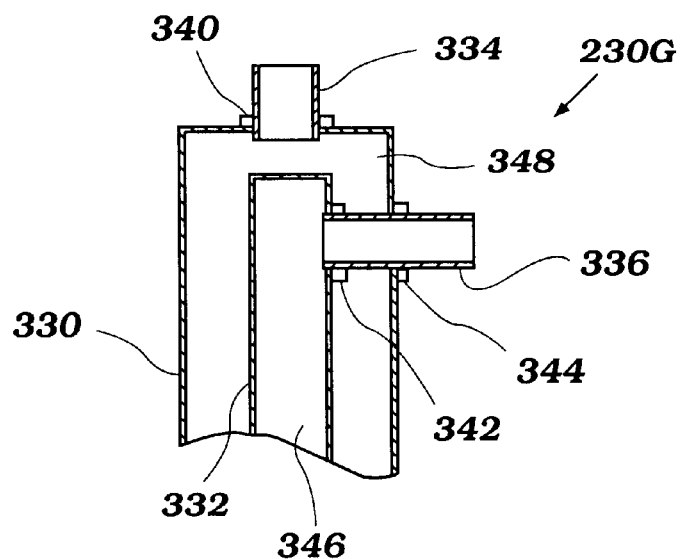
FIG. 15 is a cross-sectional view showing another variation of the fuel cooling device shown in FIG. 13.

FIG. 15 illustrates another alternative of the fuel cooling device 230G shown in FIG. 13.

In this alternative, basically, the fuel cooling device 230G is formed with double pipes. That is, an external pipe 330 encloses an internal pipe 332. Two connecting pipes 334, 336 are affixed to the pipes 330, 332 by brazing at respective joined portions 340, 342, 344 so as to open their interior outwardly. Although the reverse construction is available, in the illustrated alternative, the internal pipe 332 defines a fuel return passage 346, while the external pipe 332, with the internal pipe 332 and therebetween, defines a water passage 348.

In the event that the joined portion 342 is broken, the water in the water passage 348 may enter the fuel in the fuel return passage 346. However, except for this drawback, the construction is still useful for cooling the fuel down.

Figure 16:
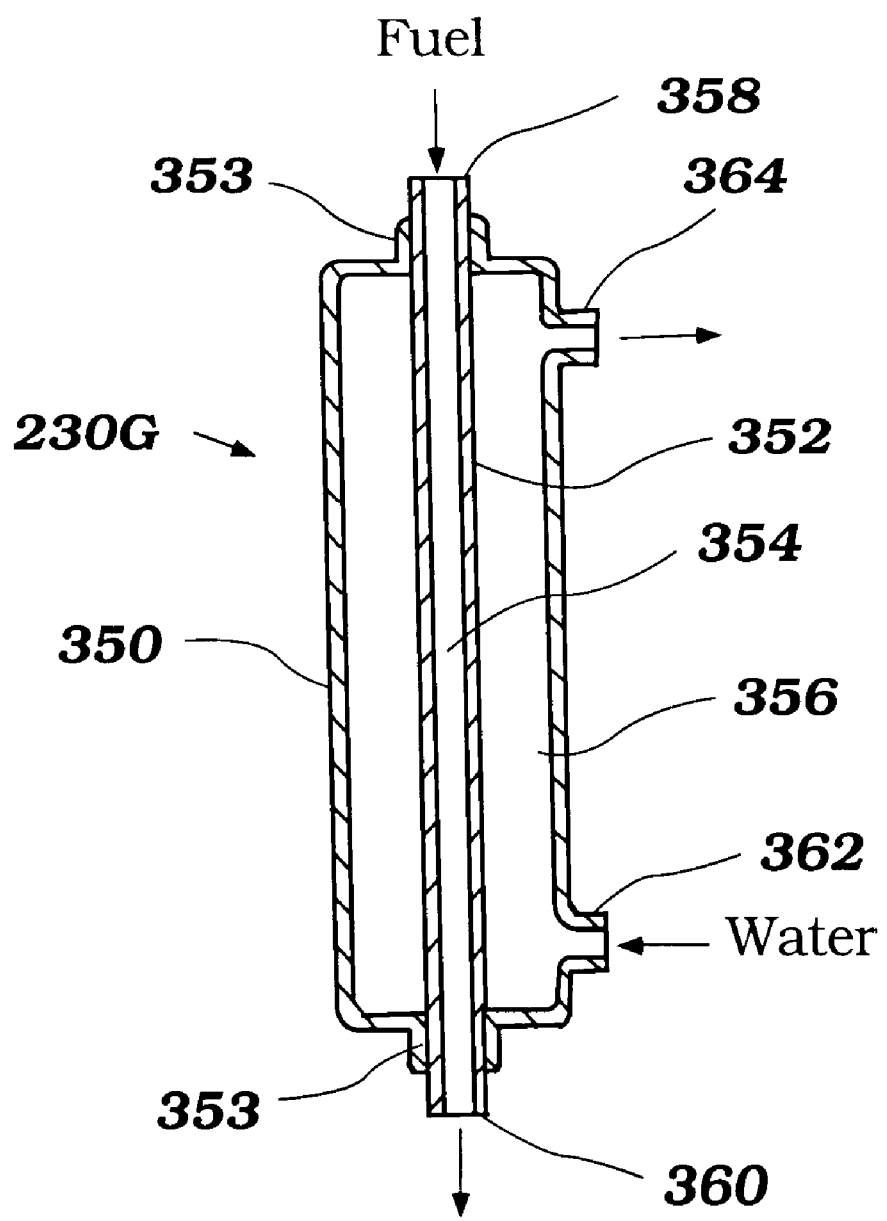
FIG. 16 is a cross-sectional view showing a further variation of the fuel cooling device shown in FIG. 13.

FIG. 16 illustrates a further alternative of the fuel cooling device 230G shown in FIG. 13.

In this alternative, basically, the fuel cooling device 230G is formed with a pipe or jacket 350 having a relatively large capacity and a straight pipe 352. The pipe 350 is made of synthetic resin and produced by blow molding, while the pipe 352 is made of brass. The resin pipe 350 has openings 353 that are formed as knurled nuts. The brass pipe 352 extends through the openings 353 and fixed there in the knurling method. The brass pipe 352 defines a fuel return passage 354, while the blow molding pipe 350 defines a water passage 356. The fuel enters a fuel inlet 358 of the pipe 352 and goes out from a fuel outlet 360. The water, in turn, enters a water inlet 362 and goes out from a fuel outlet 364.

This alternative construction can be produced at a relatively low cost in addition to that can provide effective cooling effect.

It should be noted that any one or two of the first fuel supply conduit, second fuel supply conduit and fuel return conduit or the entire conduits can pass the fuel cooling device.

The fuel cooling device is desirably formed as a unit by integrating members thereof because the unit will improve assembling or affixing works.

Also, the fuel cooling devices other than that shown in FIGS. 13 and 14 are desirably made of aluminum or aluminum alloy that has good cooling effect.

The fuel cooling device in accordance with the embodiments described above can be applied various fuel injection systems and even other fuel supply system employing carburetors in some aspects.

The fuel injection system may have a fuel injector(s) directly spraying fuel into a combustion chamber(s) instead of it (them) that sprays fuel into an intake port(s).

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments described above are intended to be within the scope of the invention disclosed herein. In addition, although this invention has been disclosed in the context of the preferred embodiments and examples and variations thereof, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by an appropriate reading of the claims that follow.

What is claimed is:

1. An internal combustion engine comprising a cylinder body defining a cylinder bore in which a piston reciprocates, a cylinder head affixed to an end of the cylinder body and defining a combustion chamber with the cylinder head and the piston, a fuel injection system including a fuel injector supplying fuel to the combustion chamber, a fuel reservoir at least temporarily storing the fuel therein, a fuel conduit communicating with at least one of the fuel reservoir and the fuel injector, and a fuel cooling device to cool the fuel passing through the fuel conduit, the fuel conduit including a first fuel supply conduit supplying fuel to the fuel reservoir, a second fuel supply conduit supplying fuel from the fuel reservoir to the fuel injector, and a fuel return conduit returning the excess fuel from the fuel injector to the fuel reservoir, at least one of the first fuel supply conduit, the second fuel supply conduit, and the fuel return conduit carrying the fuel cooled by the fuel cooling device, the fuel cooling device including a jacket having at least two channels, both of the channels juxtaposed to each other, one of the channels defining, at least in part, the corresponding one of the first fuel supply conduit, the second fuel supply conduit and the fuel return conduit, and the other channel defines a coolant conduit through which coolant passes, at least one of the channels having an incomplete partition therein to make the fuel and/or the coolant detour around it.

2. A fuel cooling device as set forth in claim 1 additionally comprising a holder made of metal material and a pair of conduit members made of metal material which has lower ionization tendency than the metal material of the holder, wherein the conduit members define each one of the fuel coolant passage and the fuel delivery passage, and the conduit members are juxtaposed with one another within the holder.

3. An internal combustion engine comprising a cylinder body defining a cylinder bore in which a piston reciprocates, a cylinder head affixed to an end of the cylinder body and defining a combustion chamber with the cylinder head and the piston, a fuel injection system including a fuel injector supplying fuel to the combustion chamber, a fuel reservoir at least temporarily storing the fuel therein, a fuel conduit communicating with at least one of the fuel reservoir and the fuel injector, and a fuel cooling device having a coolant conduit through which a coolant passes so as to cool the fuel passing through the fuel conduit, the fuel conduit including a first fuel supply conduit supplying fuel to the fuel reservoir, a second fuel supply conduit supplying fuel from the fuel reservoir to the fuel injector, and a fuel return conduit returning the excess fuel from the fuel injector to the fuel reservoir, at least one of the first fuel supply conduit, the second fuel supply conduit, and the fuel return conduit carrying the fuel cooled by the fuel cooling device, the coolant conduit and the corresponding one of the first fuel supply conduit, second fuel supply conduit and the fuel return conduit being supported by and inserted within a common holder, wherein the holder is made of a metal material, and the coolant conduit and the corresponding one of the first fuel supply conduit, second fuel supply conduit and the fuel return conduit are made of a metal material which has lower ionization tendency than the metal material of the holder.

4. An engine as set forth in claim 3, wherein the cooling device receives water within the coolant conduit, which acts as the coolant, from an open loop cooling system of the engine that includes a water inlet port.

5. An internal combustion engine comprising an engine body, a movable member movable relative to the engine body, the engine body and the movable member together defining a combustion chamber, a fuel injector spraying fuel for combustion in the combustion chamber, a fuel reservoir at least temporarily storing the fuel therein, a fuel conduit communicating with at least one of the fuel injector and the fuel reservoir, and a heat exchange device including a base member and at least a pair of tubular members embeded in the base member, the tubular members extending along one another, one of the tubular members defining a portion of the fuel conduit, another one of the tubular members defining a coolant conduit through which coolant passes, the base member being made of metal material having a first ionization tendency, and the tubular members being made of metal material having a second ionization tendency lower than the first ionization tendency.

* * * * *